United States Patent
Misra et al.

(10) Patent No.: US 10,768,893 B2
(45) Date of Patent: Sep. 8, 2020

(54) USING SIMILARITY ANALYSIS AND MACHINE LEARNING TECHNIQUES TO MANAGE TEST CASE INFORMATION

(71) Applicant: Accenture Global Solutions Limited, Dublin (IE)

(72) Inventors: Janardan Misra, Bangalore (IN); Divya Rawat, Dehradun (IN); Neville Dubash, Mumbai (IN); Sanjay Podder, Thane (MH)

(73) Assignee: Accenture Global Solutions Limited, Dublin (IE)

( * ) Notice: Subject to any disclaimer, the term of this patent is extended or adjusted under 35 U.S.C. 154(b) by 495 days.

(21) Appl. No.: 15/818,456

(22) Filed: Nov. 20, 2017

(65) Prior Publication Data

US 2019/0155572 A1   May 23, 2019

(51) Int. Cl.
| | |
|---|---|
| *G06F 9/44* | (2018.01) |
| *G06F 7/02* | (2006.01) |
| *G06N 20/00* | (2019.01) |
| *G06F 11/36* | (2006.01) |

(52) U.S. Cl.
CPC .............. *G06F 7/02* (2013.01); *G06F 11/368* (2013.01); *G06F 11/3676* (2013.01); *G06F 11/3684* (2013.01); *G06F 11/3692* (2013.01); *G06N 20/00* (2019.01)

(58) Field of Classification Search
None
See application file for complete search history.

(56) References Cited

U.S. PATENT DOCUMENTS

| | | |
|---|---|---|
| 8,156,063 B1 | 4/2012 | Rahmouni et al. |
| 9,032,360 B1 | 5/2015 | Cohen et al. |
| 9,779,013 B2 | 10/2017 | Narayan et al. |

(Continued)

FOREIGN PATENT DOCUMENTS

EP   0 938 055 A2   8/1999

OTHER PUBLICATIONS

Ahmed et al., "Test case minimization approach using fault detection and combinatorial optimization techniques for configuration-aware structural testing", Engineering Science and Technology, an International Journal, 2016, 17 pages.

(Continued)

*Primary Examiner* — Insun Kang
(74) *Attorney, Agent, or Firm* — Harrity & Harrity, LLP

(57) ABSTRACT

A device may obtain test case information for a set of test cases. The test case information may include test case description information, test case environment information, and/or test case defect information. The device may determine a set of field-level similarity scores by using a set of similarity analysis techniques to analyze a set of test case field groups associated with the test case information. The device may determine a set of overall similarity scores for a set of test case groups by using a machine learning technique to analyze the set of field-level similarity scores. The device may update a data structure that stores the test case information to establish one or more associations between the test case information and the set of overall similarity scores. The device may process a request from a user device using information included in the updated data structure.

20 Claims, 8 Drawing Sheets

(56) References Cited

U.S. PATENT DOCUMENTS

| | | | | |
|---|---|---|---|---|
| 2010/0287534 A1* | 11/2010 | Vangala | ............. | G06F 11/3612 |
| | | | | 717/124 |
| 2017/0161180 A1* | 6/2017 | Raghavan | ........... | G06F 11/3684 |
| 2017/0199811 A1* | 7/2017 | Narayan | ................ | G06N 20/00 |
| 2018/0129594 A1* | 5/2018 | Singi | ....................... | G06F 11/00 |
| 2018/0365136 A1* | 12/2018 | Kumar | ............... | G06F 11/3688 |
| 2019/0079853 A1* | 3/2019 | Makkar | ..................... | G06F 8/71 |
| 2019/0087311 A1* | 3/2019 | Donaldson | .............. | G06N 3/08 |
| 2019/0146903 A1* | 5/2019 | Hong | ................. | G06F 11/3692 |
| | | | | 714/38.1 |

OTHER PUBLICATIONS

Vangala et al., "Test Case Comparison and Clustering using Program Profiles and Static Execution", 2 pages, 2009.

Ferrari et al., "Clustering Algorithm Recommendation A Meta-learning Approach", Natural Computer Laboratory (LCoN) Mackenzie Presbyterian University, Sao Paulo, Brazil, 8 pages, 2012.

Cartaxo E., et al., "Automated Test Case Selection Based on a Similarity Function," GI Jahrestagung, 2007, pp. 381-386.

Hemmati H., et al., "An Industrial Investigation of Similarity Measures for Model-Based Test Case Selection," 2010 IEEE 21st International Symposium on Software Reliability Engineering (ISSRE), Nov. 2010, pp. 141-150.

Noor T.B., et al., "A Similarity-Based Approach for Test Case Prioritization Using Historical Failure Data," 2015 IEEE 26th International Symposium on Software Reliability Engineering (ISSRE), Nov. 2015, pp. 58-68.

\* cited by examiner

USING SIMILARITY ANALYSIS AND MACHINE LEARNING TECHNIQUES TO MANAGE TEST CASE INFORMATION

BACKGROUND

A test case may include a set of test inputs, execution conditions, and expected results developed for a particular objective. The purpose of a test case may be to detect errors or faults in a program or a system.

SUMMARY

According to some possible implementations, a device may obtain test case information for a set of test cases. The test case information may include at least one of test case description information or test case environment information. The device may determine a set of field-level similarity scores by using a set of similarity analysis techniques to analyze a set of test case field groups associated with the test case information. The device may determine a set of overall similarity scores for a set of test case groups by using a machine learning technique to analyze the set of field-level similarity scores. The device may receive feedback information associated with at least a portion of the set of overall similarity scores. The device may modify one or more values associated with the machine learning technique based on the feedback information. The device may determine a new set of overall similarity scores for the set of test case groups by using the machine learning technique with the one or more modified values to analyze the set of test case field groups. The device may update a data structure that stores the test case information to establish one or more associations between the test case information and the new set of overall similarity scores. The device may process a request from a user device using information associated with the updated data structure.

According to some possible implementations, a non-transitory computer-readable medium may store one or more instructions that, when executed by one or more processors, cause the one or more processors to obtain test case information for a set of test cases. The test case information for the set of test cases may include at least one of: test case description information, test case environment information, or test case defect information. The one or more instructions may cause the one or more processors to determine a set of field-level similarity scores by using a set of similarity analysis techniques to analyze a set of test case field groups associated with the test case information. The one or more instructions may cause the one or more processors to determine a set of overall similarity scores for a set of test case groups by using a machine learning technique to analyze the set of field-level similarity scores. The one or more instructions may cause the one or more processors to receive feedback information associated with at least a portion of the set of overall similarity scores. The one or more instructions may cause the one or more processors to modify one or more values associated with the machine learning technique based on the feedback information. The one or more instructions may cause the one or more processors to determine a new set of overall similarity scores for the set of test case groups by using the machine learning technique with the one or more modified values to analyze the set of test case field groups. The one or more instructions may cause the one or more processors to process a request from a user device using the test case information and the new set of overall similarity scores.

According to some possible implementations, a method may include obtaining, by a device, test case information for a set of test cases. The test case information for the set of test cases including at least one of: test case description information, test case environment information, or test case defect information. The method may include determining, by the device, a set of field-level similarity scores by using a set of similarity analysis techniques to analyze a set of test case field groups associated with the test case information. The method may include determining, by the device, a set of overall similarity scores for a set of test case groups by using a machine learning technique to analyze the set of field-level similarity scores. The method may include updating, by the device, a data structure that stores the test case information to establish one or more associations between the test case information and the set of overall similarity scores. The method may include processing, by the device, a request from a user device using information included in the updated data structure.

DETAILED DESCRIPTION

Figure 1A:
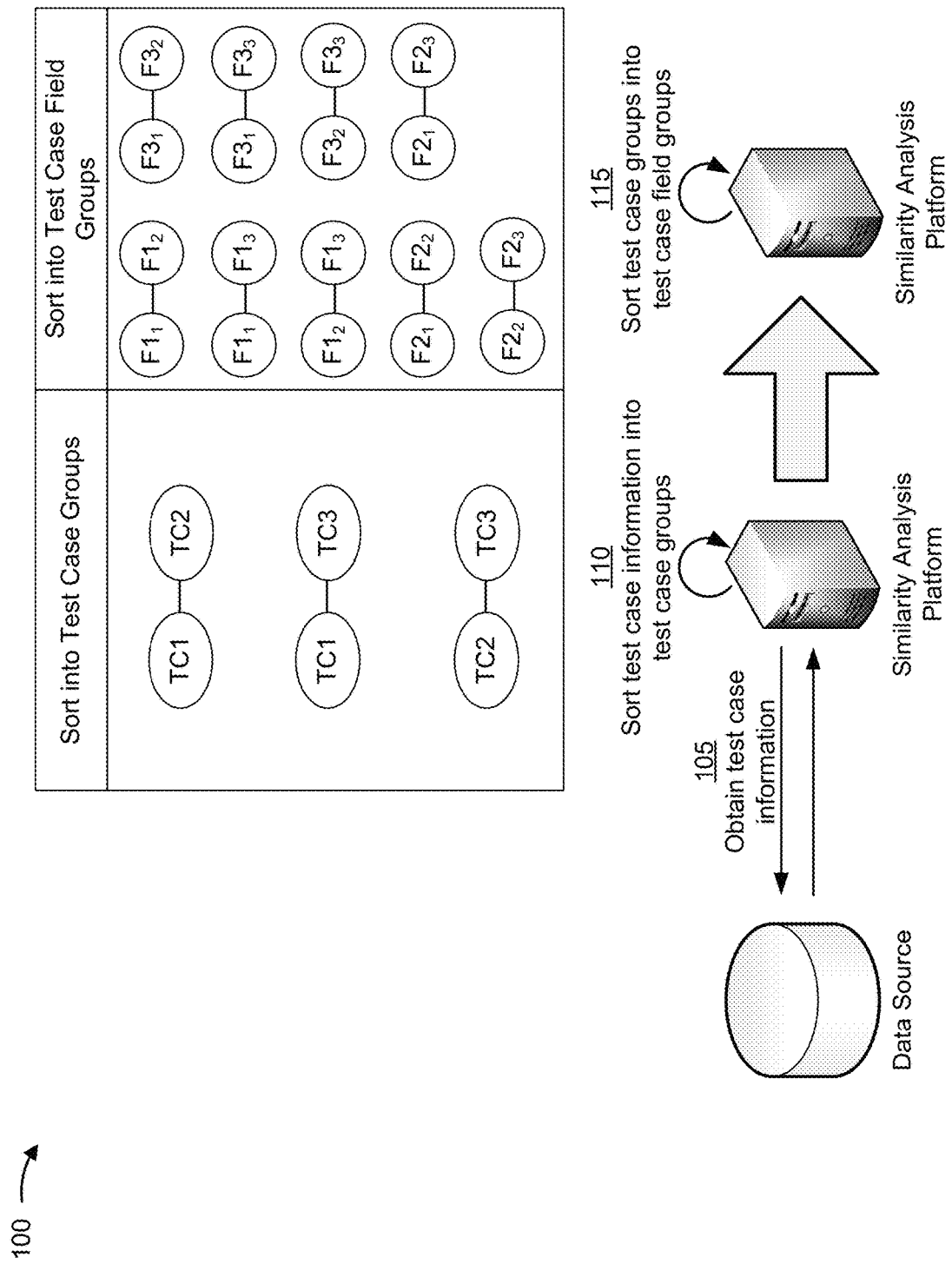
FIGS. 1A-1E are diagrams of an overview of an example implementation described herein.

The following detailed description of example implementations refers to the accompanying drawings. The same reference numbers in different drawings may identify the same or similar elements.

A test case may be used to detect errors or faults in a program or a system before the program or system is deployed or updated. In a larger organization, teams of testers (i.e., individuals that carry out the test cases) may create test cases for particular programs or systems, and may store test case information for the test cases in a test case repository. However, over time, testers may provide test case information for tens of thousands, hundreds of thousands, or even millions of test cases, which may cause the test case repository to become congested and/or disorganized. Additionally, the test case repository may store duplicate test cases, test cases with overlapping fields, and/or the like.

Some implementations described herein provide a similarity analysis platform that performs a set of similarity analysis techniques on test case information, and utilizes machine learning and feedback techniques to ensure that test cases are stored and organized in a manner that allows testers to efficiently utilize existing test cases. For example, the similarity analysis platform may obtain test case information for a set of test cases from a test case repository, and may use a set of similarity analysis and machine learning techniques to determine a set of overall similarity scores for a set of test case groups associated with the set of test cases.

Furthermore, the similarity analysis platform may interact with a feedback device to receive feedback information associated with the set of overall similarity scores, and may modify one or more values associated with the machine learning techniques based on the feedback information. In this way, the similarity analysis platform is able to use the feedback information to improve accuracy of the similarity analysis performed on the test case information.

Additionally, the similarity analysis platform may use a data structure to establish one or more associations between the test case information and the set of overall similarity scores. By associating the test case information with the set of overall similarity scores, the similarity analysis platform is able to use the associations to efficiently process requests from user devices (e.g., requests to consolidate existing test cases, requests to reorganize or sort test cases, requests to obtain test cases with particular characteristics, etc.).

In this way, the similarity analysis platform conserves memory resources by eliminating redundancies included in the test case repository. Furthermore, the similarity analysis platform conserves processing resources that might otherwise be used to search through duplicate records, that might otherwise be used to perform error correction techniques due to queries for test case information returning inaccurate results, and/or the like.

FIGS. 1A-1E are diagrams of an overview of an example implementation 100 described herein. In FIGS. 1A-1E, the similarity analysis platform may use similarity analysis techniques and/or machine learning techniques to efficiently organize and store test case information for a set of test cases, such that the test case information may be used to process requests from user devices, as described herein.

As shown in FIG. 1A, and by reference number 105, the similarity analysis platform may obtain the test case information for the set of test cases from a data source. The test case information may include test case description information, test case environment information, test case defect information, and/or the like.

The test case description information may include a set of fields describing the set of test cases, and may include a test case identifier field, a test case category field, a test case description field, a test steps field, an expected result field, a pre-conditions field, an input data type field, a status field, and/or the like. The test case environment information may include a set of fields describing an environment used to support the set of test cases, and may include fields that identify software or hardware settings to be used when executing a test case, such as web server requirements, database requirements, operating system requirements, specific hardware device requirements, and/or the like. The test case defect information may include a defect identifier field, a test case identifier field (e.g., to identify a test case that had a particular defect), a defect description field (e.g., to describe a defect), a recommendation field to recommend one or more resolutions to address a defect, and/or the like.

As shown by reference number 110, the similarity analysis platform may sort the test case information for the set of test cases into test case groups. For example, the similarity analysis platform may sort the test case information into test case groups such that a test case is grouped with every other test case of the set of test cases. In this way, the similarity analysis platform is able to group the test cases such that a similarity analysis may be performed on each test case group, as described herein.

As shown as an example, the similarity analysis platform may sort test case information for three test cases (test case one, test case two, and test case three) into three test case groups (a group with test case one and test case two, a group with test case one and test case three, and a group with test case two and test case three). In practice, there may be tens of thousands, hundreds of thousands, even millions of test case groups, such that a human operator may be unable to objectively analyze the test case groups.

As shown by reference number 115, the similarity analysis platform may sort the test case groups into test case field groups. For example, the similarity analysis platform may sort the test case groups into test case field groups such that matching fields are included in the same test case field group.

As shown an example, test case one, test case two, and test case three may each have three test case fields. For example, field one may be a field associated with test case description information, field two may be a field associated with test case environment information, and field three may be a field associated with test case defect information. In this case, the similarity analysis platform may sort the test case fields into test case field groups, such that test case field groups are created for each possible pair of test case fields that share the same field type.

In this way, the similarity analysis platform is able to sort test case information into test case field groups that may be analyzed with a set of similarity analysis techniques, as described herein.

Figure 1B:
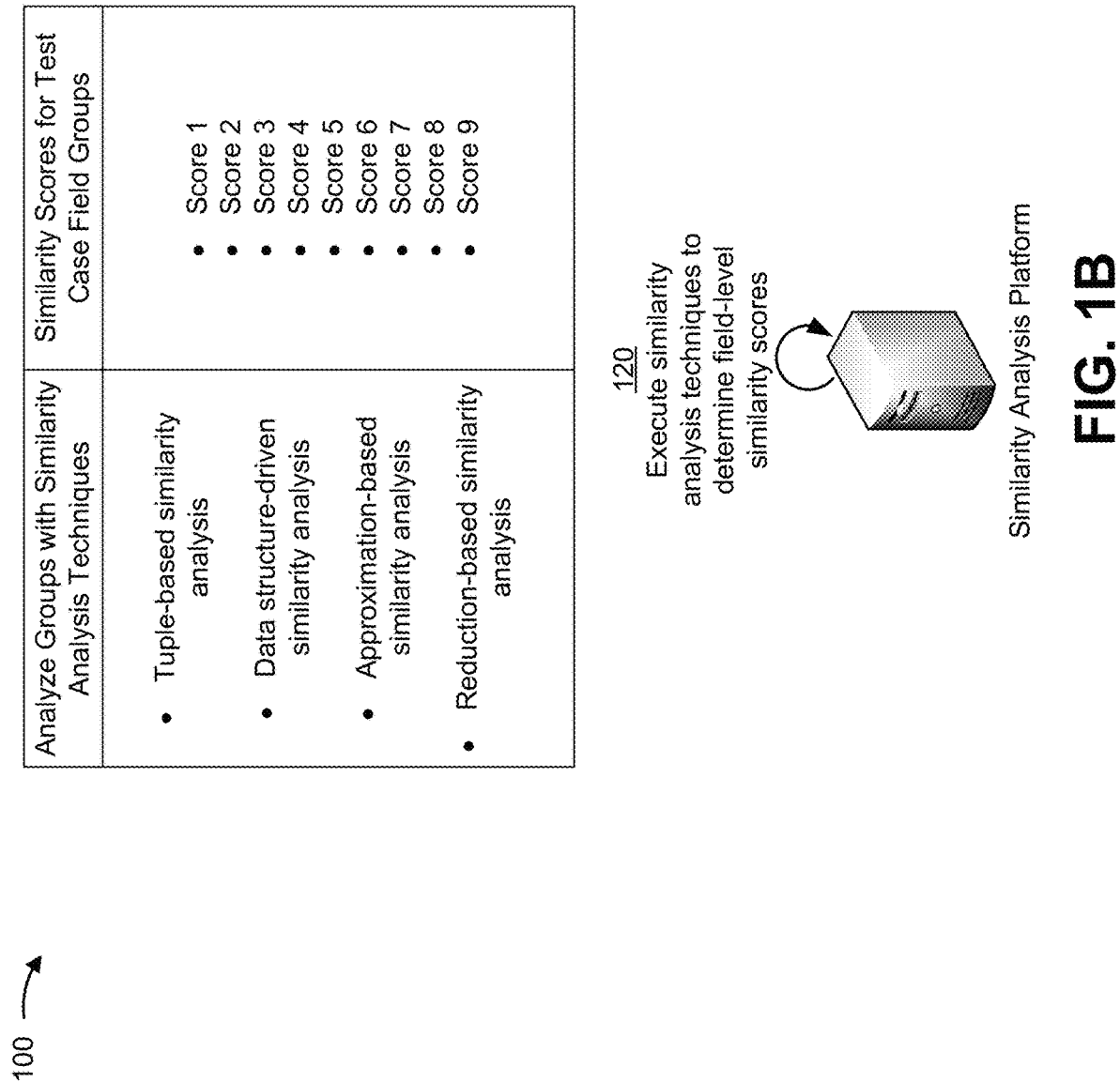

As shown in FIG. 1B, and by reference number 120, the similarity analysis platform may execute a set of similarity analysis techniques to determine a set of field-level similarity scores. For example, the similarity analysis platform may execute a tuple-based similarity analysis technique, a data structure-driven similarity analysis technique, an approximation-based similarity analysis technique, a reduction-based similarity analysis technique, and/or the like. In this case, the similarity analysis platform may use the set of similarity analysis techniques to determine a field-level similarity score for each test case field group. If multiple similarity analysis techniques are used on the same test case field group, the similarity score may be a combination (e.g., an average or a weighted average) of the multiple similarity analysis techniques.

In some cases, different similarity analysis techniques may be applied to different test case field groups. For example, a test case status field may store a "pass" value or a "fail" value (e.g., to indicate a result of a test case). In this case, the similarity analysis platform may perform character-by-character similarity analysis to accurately compare the values. However, a test case description field may include free-form text that is created by a human tester, and may require use of more complex similarity analysis techniques, such as the tuple-based similarity analysis technique, the data structure-driven similarity analysis technique, and/or the like, which are described in detail elsewhere herein.

In this way, the similarity analysis platform is able to use a set of similarity analysis techniques to determine field-level similarity scores for the test case field groups.

Figure 1C:
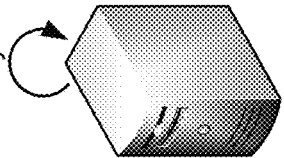

As shown in FIG. 1C, and by reference number 125, the similarity analysis platform may determine an overall similarity score for each test case group. For example, the similarity analysis platform may determine an overall similarity score for a test case group by determining an overall similarity score for test case description field groups, an overall similarity score for test case environment field groups, and an overall similarity score for test case defect field groups. In this case, the similarity analysis platform may analyze (e.g., using weights, averages, data models, etc.) the overall similarity score for the test case description field groups, the overall similarity score for the test case environment field groups, and the overall similarity score for the test case defect field groups to determine the overall similarity score for the test case group.

As an example, the similarity analysis platform may use a data model to determine an overall similarity score. For example, the similarity analysis platform may train a data model on historical test case information, and may provide the set of field-level similarity scores as input to the data model to cause the data model to output a set of overall similarity scores.

In this way, the similarity analysis platform is able to determine overall similarity scores for the test case groups.

Figure 1D:
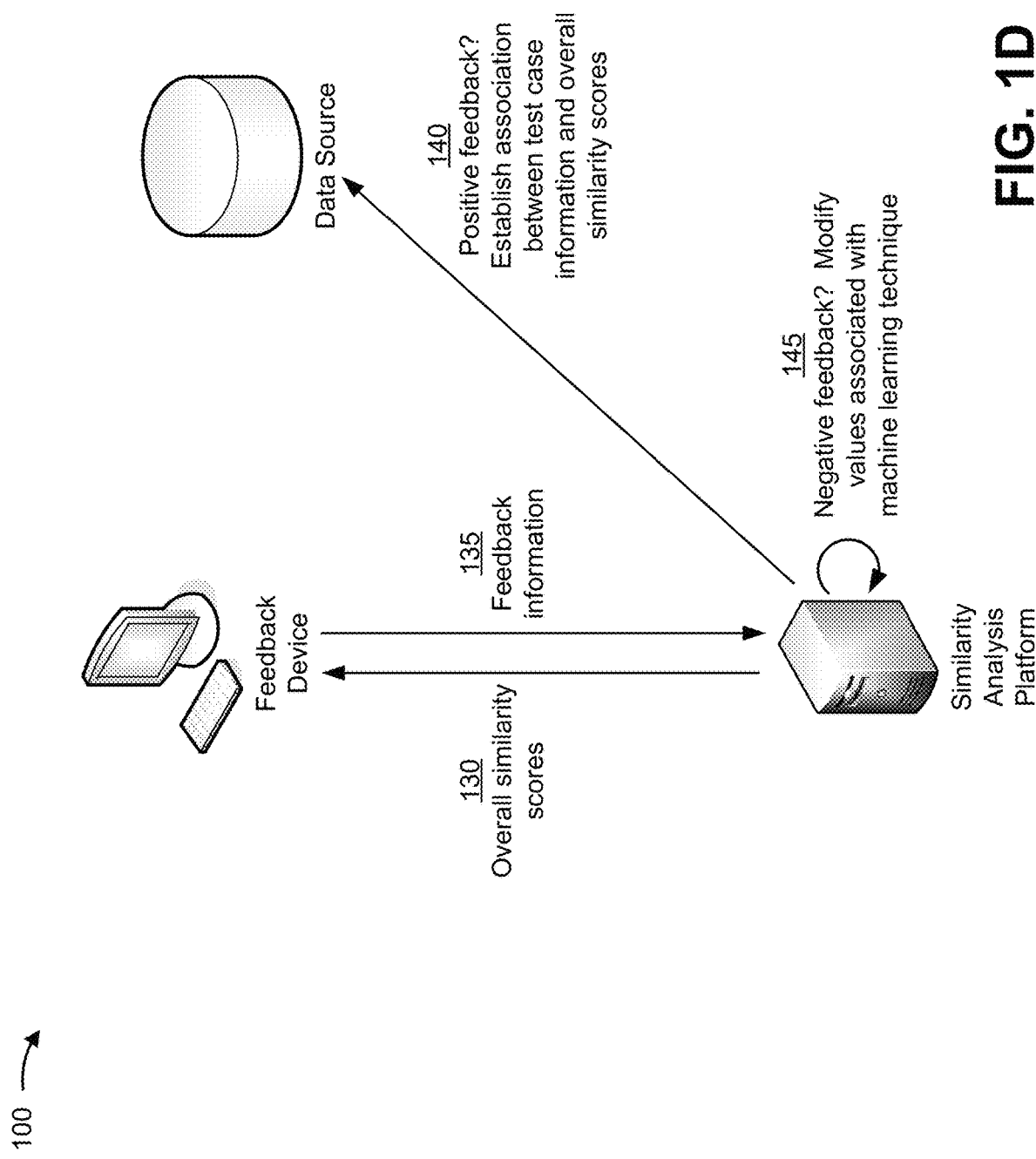

As shown in FIG. 1D, and by reference number 130, the similarity analysis platform may provide the set of overall similarity scores to a feedback device. As shown by reference number 135, the feedback device may provide feedback information to the similarity analysis platform. For example, a user may interact with a user interface to input feedback information for at least a portion of the set of overall similarity scores. In this case, the feedback information may include overall feedback relating to test case groups or feedback relating to particular test case field groups.

As shown by reference number 140, if the feedback information includes positive feedback, the similarity analysis platform may update a data structure that stores the test case information to establish one or more associations between the test case information and the set of overall similarity scores. For example, assume the feedback information indicates that an overall similarity score for a particular test case group is correct. In this case, the similarity analysis platform may update the data structure that is used to store the test case information to indicate that test cases associated with the particular test case group are similar or dissimilar.

As shown by reference number 145, if the feedback information includes negative feedback (i.e., if an overall similarity score and/or a field-level similarity score is scored incorrectly), the similarity analysis platform may modify (e.g., increase, decrease, etc.) one or more values associated with the machine learning technique. For example, assume the feedback information indicates that an overall similarity score for a particular test case group is incorrect. In this case, the similarity analysis platform may modify one or more data model values and/or weights used to generate the overall similarity score.

In some implementations, the similarity analysis platform may continue receiving feedback information until the feedback information includes a threshold level of positive or negative feedback. For example, the similarity analysis platform may compare an amount of positive feedback or an amount of negative feedback to a threshold value to determine whether the feedback information satisfies a threshold level of accuracy. In this case, the similarity analysis platform may continue modifying data model values and/or weights used to generate the overall similarity scores until the threshold level of accuracy of satisfied.

In this way, the similarity analysis platform is able to use feedback information to improve accuracy of the similarity analysis.

Figure 1E:
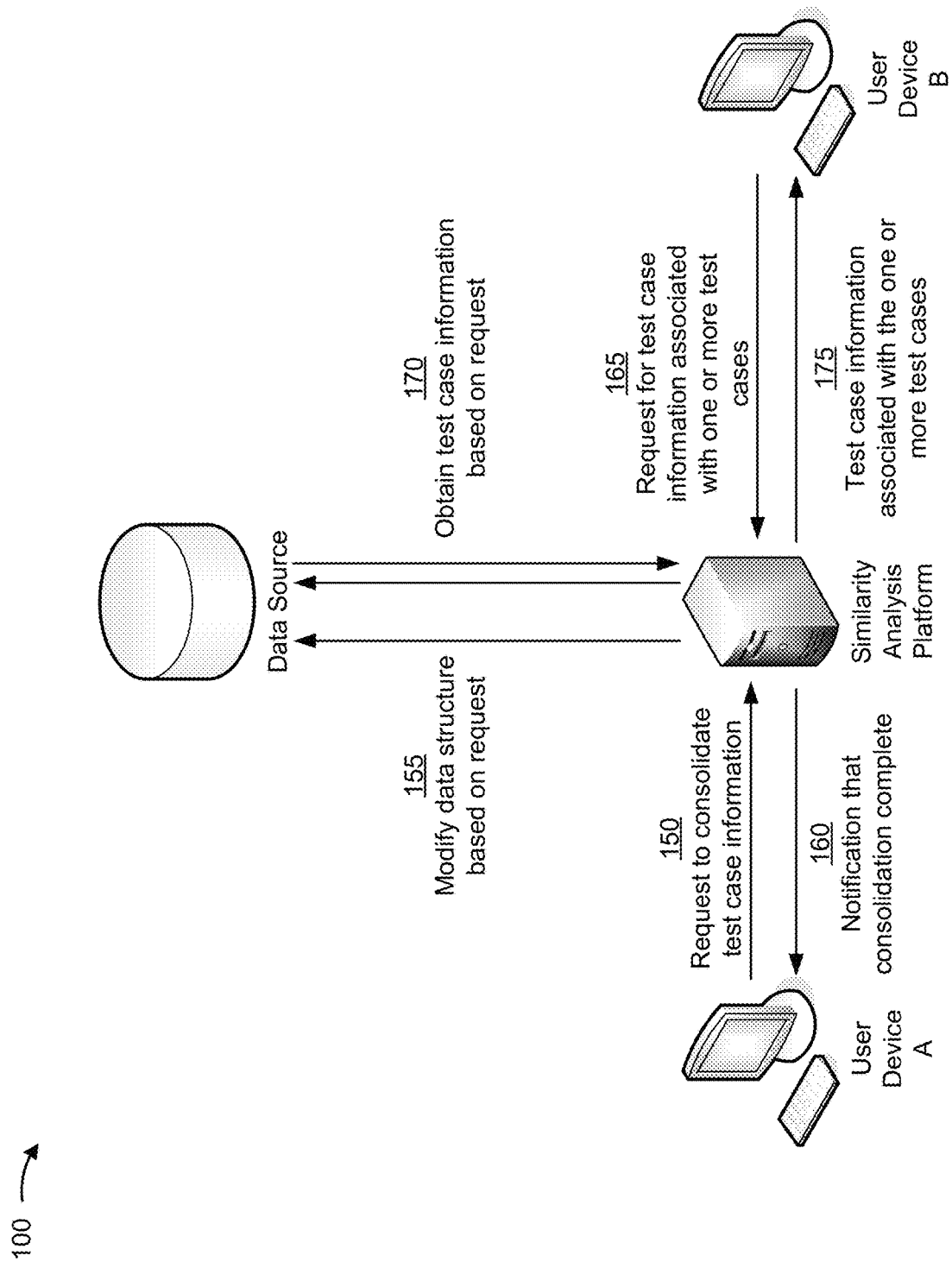

As shown in FIG. 1E, and by reference number 150, the similarity analysis platform may receive, from user device A, a request to consolidate the test case information. For example, the similarity analysis platform may receive a request to remove duplicate test case information (e.g., identical test cases, test cases that satisfy a threshold level of similarity, etc.).

As shown by reference number 155, the similarity analysis platform may query the data source that stores the test case information to identify and remove duplicate test case information. In this case, the similarity analysis platform may remove duplicate test case information for test cases that satisfy the threshold level of similarity to conserve memory and storage resources. Additionally, if a first test case and a second test case satisfy a threshold level of similarity, but the first test case includes fields not present in the second test case, then the similarity analysis platform may merge the test cases together such that one test case remains but includes test case information from both the first test case and the second test case. As shown by reference number 160, the similarity analysis platform may provide a notification to user device A that the consolidation is complete.

As shown by reference number 165, the similarity analysis platform may receive, from user device B, a request for test case information associated with one or more test cases. For example, the similarity analysis platform may receive a request that includes one or more parameters identifying characteristics of test cases.

As shown by reference number 170, the similarity analysis platform may obtain test case information for one or more test cases from the data source. For example, the similarity analysis platform may use the one or more parameters included in the request to query, from the data source, test case information that is similar to the one or more parameters included in the request. As shown by reference number 175, the similarity analysis platform may provide the test case information associated with the one or more test cases to user device B.

In this way, the similarity analysis platform is able to consolidate the data structure that stores test case information to conserve memory resources. Furthermore, the similarity analysis platform conserves processing resources that might otherwise be used to search through duplicate test cases or that might be used to perform error correction techniques after queries for test cases return inaccurate results.

As indicated above, FIGS. 1A-1E are provided merely as an example. Other examples are possible and may differ from what was described with regard to FIGS. 1A-1E.

Figure 2:
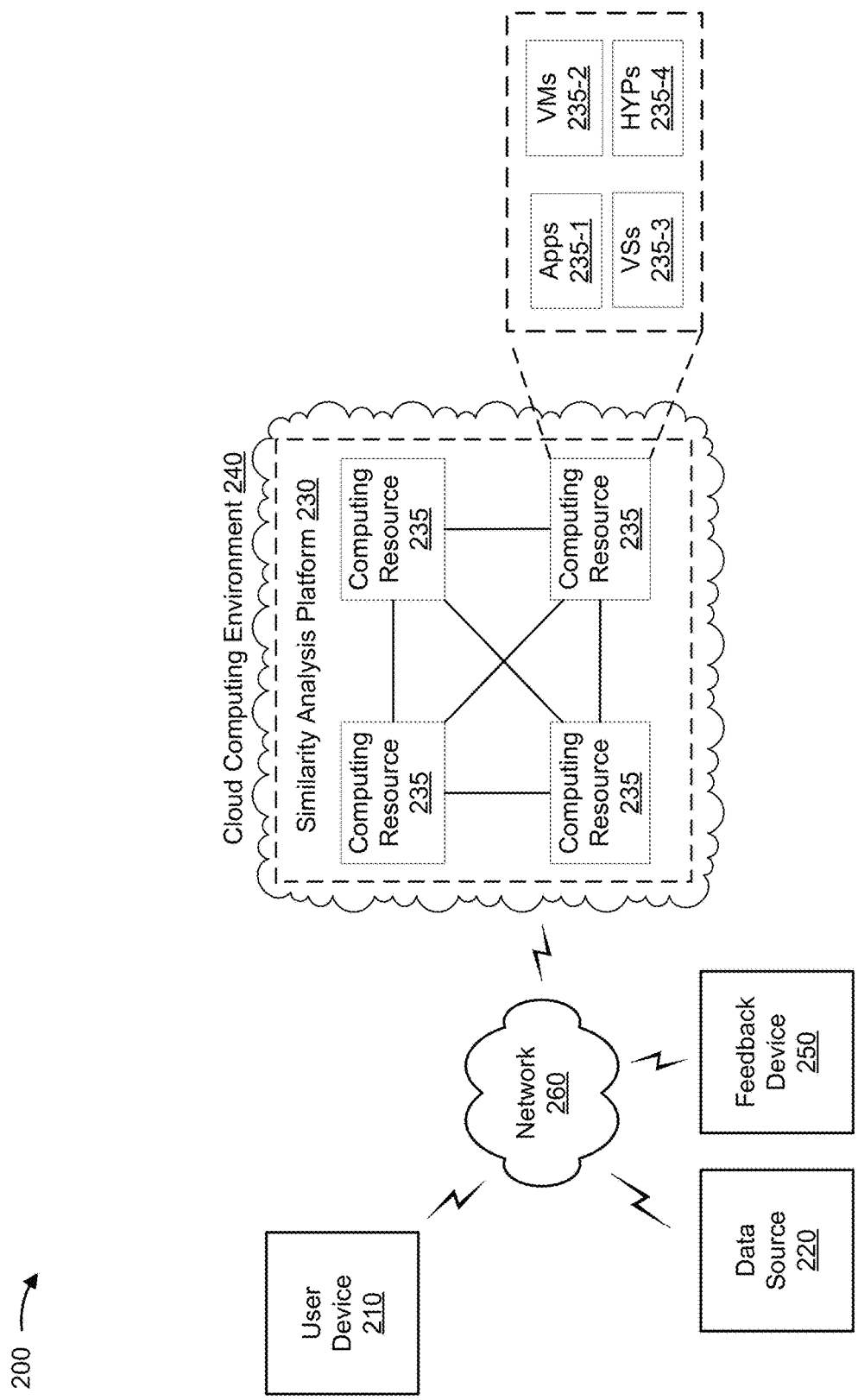
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data source 220, a similarity analysis platform 230 hosted by a cloud computing environment 240, a feedback device 250, and/or a network 260. Devices of environment 200 may interconnect via wired connections, wireless connections, optical connections, or a combination of connections.

User device 210 includes one or more devices capable of receiving, generating, storing, processing, and/or providing information associated with test cases. For example, user device 210 may include a computing device (e.g., a desktop computer, a laptop computer, a tablet computer, a handheld computer, a server, etc.), a phone (e.g., a mobile phone, such as a smart phone, a radiotelephone, etc.), or a similar device. In some implementations, user device 210 may provide a request to similarity analysis platform 230. In some implementations, user device 210 may receive a response from similarity analysis platform 230, whereby information included in the response is obtained from data source 220.

Data source 220 includes one or more devices capable of receiving, storing, generating, processing, and/or providing information associated with test cases. For example, data source 220 may include a computing device (e.g., a desktop computer, a laptop computer, a tablet computer, a handheld computer, a server device, etc.), a mobile phone (e.g., a smart phone, a radiotelephone, etc.), or a similar device. In some implementations, data source 220 may provide test case information to similarity analysis platform 230. Additionally, or alternatively, data source 220 may modify test case information associated with one or more test cases based on a request from similarity analysis platform 230.

Similarity analysis platform 230 includes one or more devices capable of receiving, storing, generating, processing, and/or processing information associated with test cases. For example, similarity analysis platform 230 may include a server device (e.g., in a data center or a cloud computing environment), a data center, a workstation computer, a virtual machine (VM) provided in a cloud computing environment, or a similar type of device.

In some implementations, as shown, similarity analysis platform 230 may be hosted in cloud computing environment 240. Notably, while implementations described herein describe similarity analysis platform 230 as being hosted in cloud computing environment 240, in some implementations, similarity analysis platform 230 might not be cloud-based (i.e., may be implemented outside of a cloud computing environment) or may be partially cloud-based.

Cloud computing environment 240 includes an environment that hosts similarity analysis platform 230. Cloud computing environment 240 may provide computation, software, data access, storage, and/or other services that do not require end-user knowledge of a physical location and configuration of system(s) and/or device(s) that host similarity analysis platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host similarity analysis platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 includes one or more software applications that may be provided to or accessed by user device 210, feedback device 250, or a similar type of device. Application 235-1 may eliminate a need to install and execute the software applications on user device 210, feedback device 250, or a similar type of device. For example, application 235-1 may include software associated with similarity analysis platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating system to the guest operating systems, and may manage the execution of the guest operating systems. Multiple instances of a variety of operating systems may share virtualized hardware resources.

Feedback device 250 includes one or more devices capable of receiving, generating, storing, processing, and/or providing feedback information associated with test cases. For example, feedback device 250 may include a computing device (e.g., a desktop computer, a laptop computer, a tablet computer, a handheld computer, a server, etc.), a phone (e.g., a mobile phone, such as a smart phone, a radiotelephone, etc.), or a similar device. In some implementations, feedback device 250 may receive, from similarity analysis platform 230, a set of overall similarity scores. In some implementations, feedback device 250 may provide feedback information to similarity analysis platform 230, via network 260.

Network 260 includes one or more wired and/or wireless networks. For example, network 260 may include a cellular network (e.g., a fifth generation (5G) network, a fourth generation (4G) network, such as a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
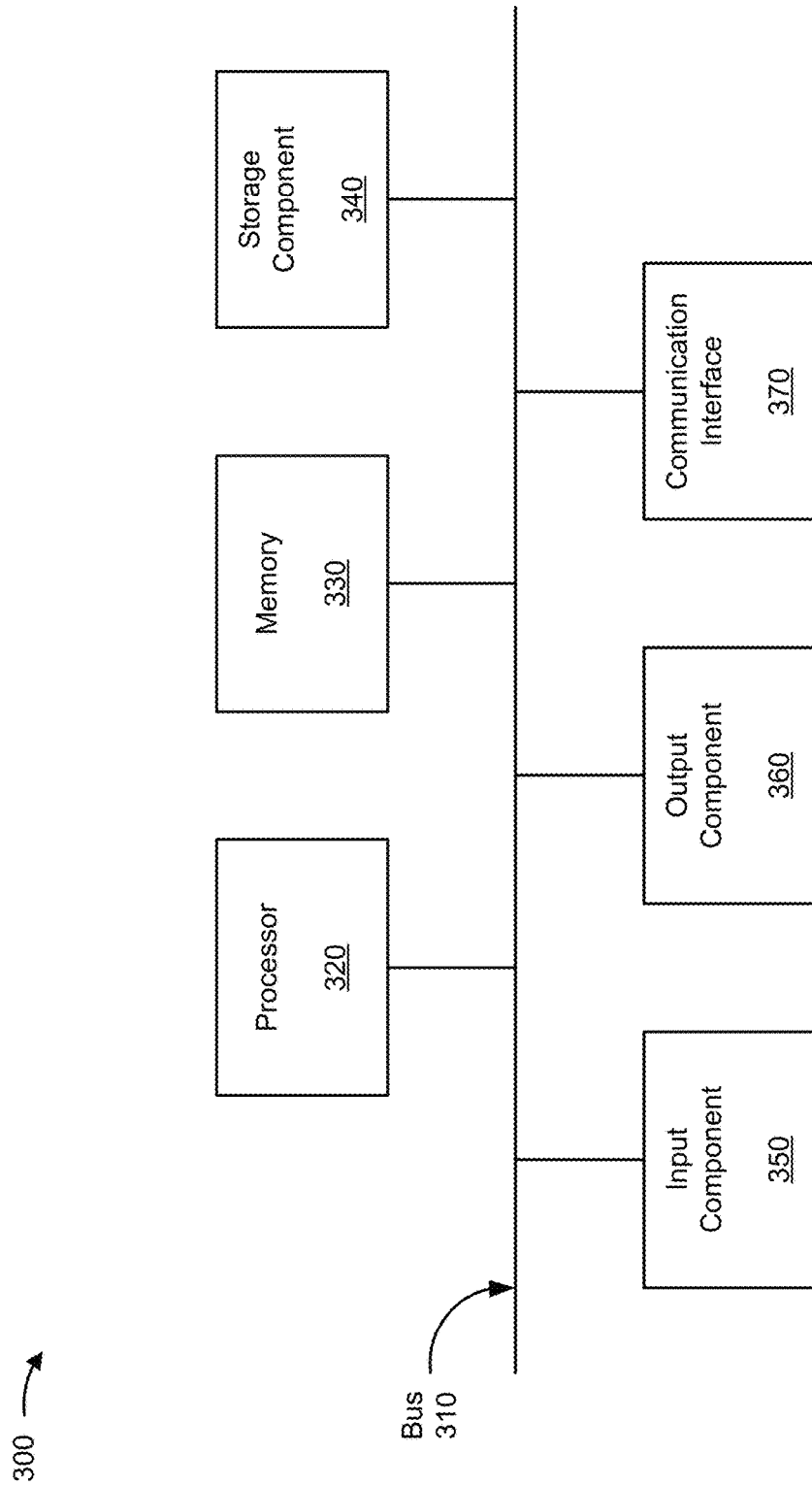
FIG. 3 is a diagram of example components of one or more devices of FIG. 2.

FIG. 3 is a diagram of example components of a device 300. Device 300 may correspond to user device 210, data source 220, similarity analysis platform 230, and/or feedback device 250. In some implementations, user device 210, data source 220, similarity analysis platform 230, and/or feedback device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
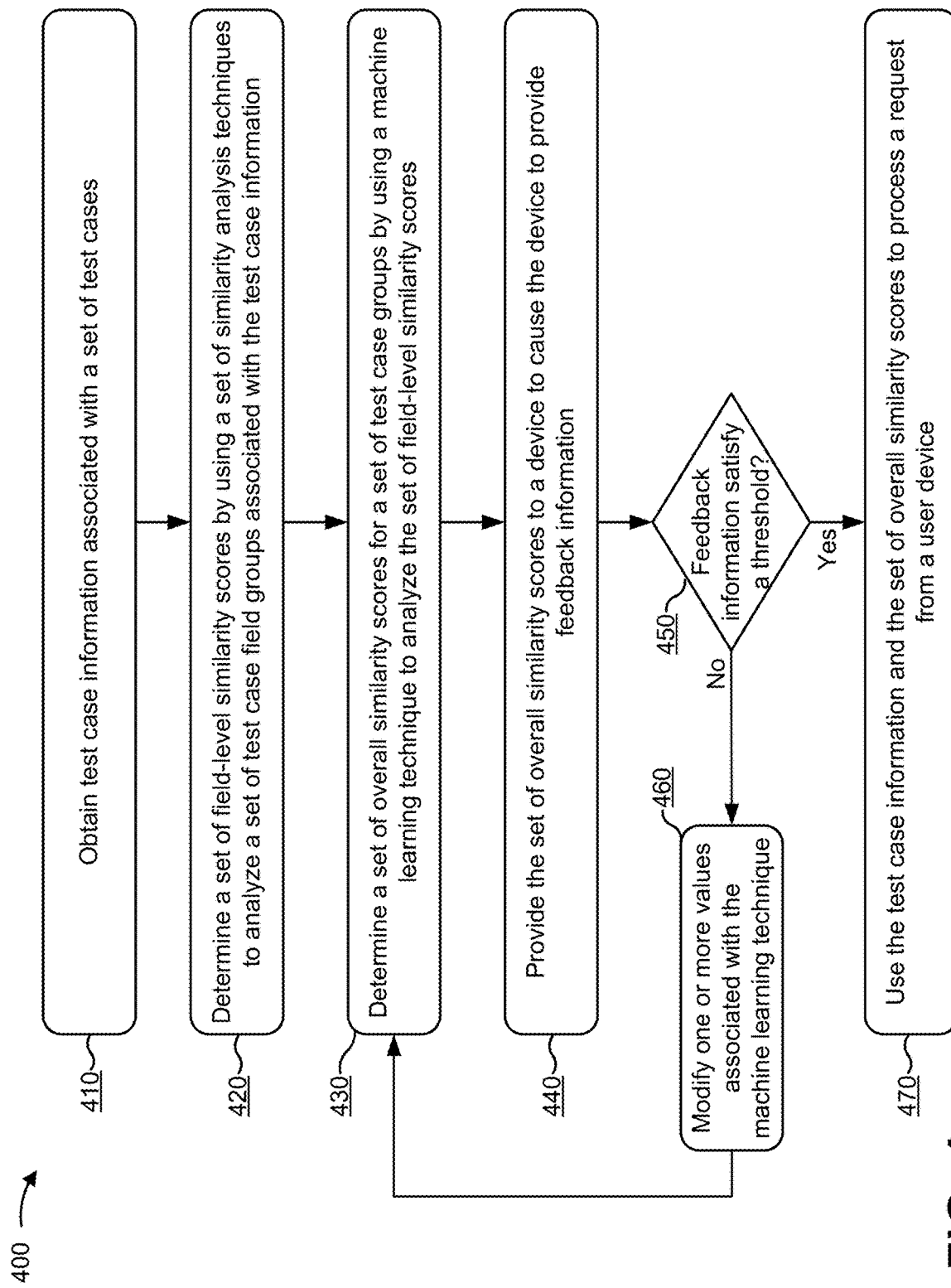
FIG. 4 is a flow chart of an example process for determining a set of overall similarity scores for a set of test cases, and using the overall similarity scores to process requests for a user device.

FIG. 4 is a flow chart of an example process 400 for determining a set of overall similarity scores for a set of test cases, and using the overall similarity scores to process requests for a user device. In some implementations, one or more process blocks of FIG. 4 may be performed by similarity analysis platform 230. In some implementations, one or more process blocks of FIG. 4 may be performed by another device or a group of devices separate from or including similarity analysis platform 230, such as user device 210, data source 220, and/or feedback device 250.

As shown in FIG. 4, process 400 may include obtaining test case information for a set of test cases (block 410). For example, similarity analysis platform 230 may obtain, from data source 220, test case information associated with a set of test cases. The test case information may include test case description information, test case environment information, test case defect information, and/or the like.

In some implementations, data source 220 may store test case information. For example, data source 220 may store test case information using one or more data structures, such as a graph, a table, a linked-list, an array, a hash table, a tree, a database, and/or the like. In this case, data source 220 may store large quantities of data (e.g., hundreds of thousands, millions, billions, etc. of data points), such that a human operator or an inferior data source may be objectively unable to store and/or process.

In some implementations, data source 220 may store test case description information that includes a set of fields that describe characteristics of test cases. The test case description fields may include a test case identifier field, a test case category field, a test case description field, a test steps field, an expected result field, a pre-conditions field, an input data type field, a status field, and/or the like. The test case identifier field may store a unique identifier for a particular test case. The test category field may identify a category to which a group of test cases belong. The test case description field may summarize functionality of a test case. The test steps field may identify a set of steps needed to carry out a test case. The expected result field may identify a predicted outcome of each step of a test case.

Additionally, the pre-conditions field may identify prerequisites that are to be satisfied before execution of the test case (e.g., to test a user login of a particular domain, there may be a pre-condition that the domain is valid). The input data type field may identify one or more acceptable data types that may be used when testing (e.g., a string type, a numeric type, an enumerator type, a file type, etc.). The status field may indicate a result of a particular test case or of a particular step in a test case (e.g., pass or fail).

Additionally, or alternatively, data source 220 may store test case environment information that includes a set of fields describing software or hardware settings to be used when executing a test case. For example, data source 220 may store a field indicating web server requirements, a field indicating database requirements, a field indicating operating system requirements, a field indicating specific hardware device requirements, and/or the like.

Additionally, or alternatively, data source 220 may store test case defect information that includes a set of fields describing characteristics of defects associated with test cases. For example, the test case defect information may include a defect identifier field, a test case identifier field (e.g., to indicate a test case that had a particular test case defect), a defect description field (e.g., to describe a defect), a recommendation field to recommend one or more resolutions to address a defect, and/or the like.

In some implementations, similarity analysis platform 230 may standardize the test case information. For example, similarity analysis platform 230 may receive test case information associated with different data types, data formats, and/or the like, and may standardize the test case information to a uniform data type, data format, and/or the like. In some implementations, similarity analysis platform 230 may apply different standardization techniques for different data types or data formats. By using an appropriate standardization technique for a particular data type or data format, similarity analysis platform 230 may conserve processing resources relative to using an inappropriate standardization technique.

In this way, similarity analysis platform 230 is able to obtain test case information associated with a set of test cases.

As further shown in FIG. 4, process 400 may include determining a set of field-level similarity scores by using a set of similarity analysis techniques to analyze a set of test case field groups associated with the test case information (block 420). For example, similarity analysis platform 230 may sort the test case information into test case groups, sort the test case groups into test case field groups, and may use a set of similarity analysis techniques to determine a set of similarity scores for the test case field groups. The set of similarity analysis techniques may include a tuple-based similarity analysis technique, a data structure-driven similarity analysis technique, an approximation-based similarity analysis technique, a reduction-based similarity analysis technique, and/or the like.

In some implementations, similarity analysis platform 230 may sort the test case information into a set of test case groups. For example, similarity analysis platform 230 may sort the test case information into a set of test case groups, such that a test case is grouped with every other test case of the set of test cases. A test case group may include test case information for two or more test cases.

In some implementations, similarity analysis platform 230 may sort the set of test case groups into a set of test case field groups. For example, similarity analysis platform 230 may sort the test case groups into test case field groups such that matching fields are included in the same test case field group. An example of how similarity analysis platform 230 can sort test case information is shown and described with regard to FIG. 1A.

In some implementations, similarity analysis platform 230 may analyze the set of test case field groups using a tuple-based similarity analysis. For example, similarity analysis platform 230 may determine one or more tuples associated with test case values for a particular test case field group. A tuple may include a value identifying a subject (e.g., a user authorized to perform a particular action), a value identifying a predicate (e.g., an action to be performed), one or more values of objects affected by the predicate, and/or the like. In this case, similarity analysis platform 230 may determine a tuple (e.g., a subject-predicate-object (SPO) tuple) by using a natural language processing technique, such as a technique that identifies tagged words, identifies parts of speech indicators, identifies nouns and/or verbs, removes stop words, and/or the like.

In some implementations, when performing a tuple-based similarity analysis, similarity analysis platform 230 may create a tuple for each test case, a tuple for each field, multiple tuples per field, and/or the like. For example, similarity analysis platform 230 might create tuples such that a field that identifies steps of a test case may have one tuple per step.

In some implementations, similarity analysis platform 230 may determine a degree of similarity between tuples. For example, similarity analysis platform 230 may compare a first tuple to a second tuple by comparing specific values included in the tuples. In this case, similarity analysis platform 230 may determine a tuple-based similarity value indicating a degree of similarity between tuples. If the tuple-based similarity analysis technique is the only similarity analysis technique used to analyze a test case field group, then the tuple-based similarity value may be used as a field-level similarity score the for the test case field group. If additional similarity analysis techniques are used to analyze the test case field group, then the tuple-based similarity value may be one of the factors in determining the field-level similarity score for the test case field group.

As an example, assume similarity analysis platform 230 determines a first SPO tuple with a subject value of "subject1," a predicate value of "predicate1," and an object value of "object1." Further assume similarity analysis platform 230 determines a second SPO tuple with a subject value of "subject2," a predicate value of "predicate1," and an object value of "object3." In this case, similarity analysis platform 230 may compare subject values to subject values, predicate values to predicate values, and object values to object values. The result may indicate that the subject values for the first SPO tuple and second SPO tuple are different, that the predicate values are the same, and that the object values are different.

Additionally, or alternatively, similarity analysis platform 230 may execute a data structure-driven similarity analysis technique. For example, similarity analysis platform 230 may use a data structure to store terms (e.g., a domain glossary, an ontology, a taxonomy, etc.), and may reference the terms when performing a similarity analysis.

As an example, similarity analysis platform 230 may identify a first set of words or phrases associated with a first test case and a second set of words or phrases associated with a second test case. Here, similarity analysis platform 230 may use the data structure that stores terms to analyze the first set of words or phrases and the second set of words or phrases to determine whether the first and second set of words or phrases are similar or dissimilar. In some cases, the data structure may be supported by similarity analysis platform 230. In other cases, the data structure may be supported by an external source and may be referenced via an application programming interface (API) call.

As a specific example, assume a Test Case Scenario 1 of "Verify enrollment unit for error code DR" and a Test Case Scenario 2 of "Check registration system for error code JM". In this case, the "enrollment unit" and "registration system" may be the same component, but would not be found to be similar given a character by character similarity analysis. However, by using a data structure that stores related terms together, similarity analysis platform 230 may reference the data structure to determine whether the terms are similar (despite having different characters).

Additionally, or alternatively, similarity analysis platform 230 may execute an approximation-based similarity analysis technique. For example, similarity analysis platform 230 may execute an approximation-based similarity analysis technique to reduce false negatives (i.e., similar items falsely determined to be dissimilar as a result of spelling mistakes, recording errors, and/or the like). A false negative may occur when similarity analysis platform 230 identifies two compared words or phrases as dissimilar when the words or phrases are in fact similar. In this case, similarity analysis platform 230 may set a threshold level of similarity, and may compare a first word or phrase and a second word or phrase. Additionally, similarity analysis platform 230 may determine that the first word or phrase and the second word or phrase are similar if the first word or phrase and the second word or phrase satisfy the threshold level of similarity.

Additionally, or alternatively, similarity analysis platform 230 may execute a reduction-based similarity analysis technique to reduce words or phrases to a base form. For example, similarity analysis platform 230 may execute a lemmatization technique, a stemming technique, and/or the like, to reduce words or phrases to a shortest possible form. As an example, a lemmatization and/or stemming technique may be used to reduce "transformed," "transforming," and "transformation" to the base form "transform."

In some implementations, similarity analysis platform 230 may execute one or more of the above described similarity analysis techniques on test case field groups associated with test description information, test case field groups associated with test case environment information, and/or test case field groups associated with test case defect information.

In some implementations, similarity analysis platform 230 may execute one or more similarity analysis techniques on the same test case field group. For example, similarity analysis platform 230 may use a tuple-based similarity analysis technique, a data structure-driven similarity analysis technique, an approximation-based similarity analysis technique, and a reduction-based similarity analysis technique on a particular test case field group. In this case, similarity analysis platform 230 may determine a field-level similarity score for the test case field group by taking an average, or a weighted average, of the similarity scores generated by each similarity analysis technique.

In this way, similarity analysis platform 230 is able to determine a set of similarity scores for test case field groups associated with the test case information.

As further shown in FIG. 4, process 400 may include determining a set of overall similarity scores for a set of test case groups by using a machine learning technique to analyze the set of field-level similarity scores (block 430). For example, for each test case group of a set of test case groups, similarity analysis platform 230 may determine an overall similarity score for test case field groups that include test case description information, an overall similarity score for test case field groups that include test case environment information, and an overall similarity score for test case field groups that include test case defect information. In this case, similarity analysis platform 230 may determine an overall similarity score by further processing the three above-mentioned overall similarity scores.

In some implementations, similarity analysis platform 230 may determine an overall similarity score for test case field groups that include test case description information. For example, similarity analysis platform 230 may analyze the set of field-level similarity scores for the test case field groups that include test case description information to determine an overall similarity score. As an example, similarity analysis platform 230 may determine an overall similarity score by computing an average similarity score from the field-level similarity scores that are associated with the test case description information. Additionally, similarity analysis platform 230 may weight particular field-level similarity scores when determining the overall similarity score.

Additionally, or alternatively, similarity analysis platform 230 may determine an overall similarity score for test case field groups that include test case environment information, in a similar manner as described above. Additionally, or alternatively, similarity analysis platform 230 may determine an overall similarity score for test case field groups that include test case defect information, in a similar manner as described above.

In some implementations, similarity analysis platform 230 may determine an overall similarity score. For example, similarity analysis platform 230 may determine an overall score by taking an average or a weighted average of the overall similarity scores of different types of fields (e.g., the overall similarity score for the test case description fields, the overall similarity score for the test case environment fields, and the overall similarity score for the test case defect fields).

In some implementations, similarity analysis platform 230 may determine an overall similarity score using a data model. For example, assume similarity analysis platform 230 may train a data model using historical test case information. In this case, similarity analysis platform 230 may provide the set of field-level similarity scores as input to the data model, which may cause the data model to output an overall similarity score.

In this way, similarity analysis platform 230 is able to determine an overall similarity score for test case groups.

As further shown in FIG. 4, process 400 may include providing the set of overall similarity scores to a device to cause the device to provide feedback information (block 440). For example, similarity analysis platform 230 may provide the set of overall similarity scores to feedback device 250, which may cause a user to interact with feedback device 250 to provide feedback information. Feedback information may include overall feedback indicating whether overall similarity scores are accurately classified as similar or dissimilar, field-level feedback indicating whether field-level similarity scores are accurately classified as similar or dissimilar, and/or the like.

In some implementations, similarity analysis platform 230 may provide the set of overall similarity scores to feedback device 250. For example, similarity analysis platform 230 may provide the set of overall similarity scores for display on a user interface of feedback device 250. In some implementations, similarity analysis platform 230 may, instead of providing the overall similarity scores, provide information identifying duplicate test cases, information identifying sorted groups of test cases (e.g., sorted based on the similarity analysis), and/or the like.

In some implementations, similarity analysis platform 230 may receive feedback information from feedback device 250. For example, a user may interact with feedback device 250 to input feedback information associated with at least a portion of the set of overall similarity scores, which may be sent to similarity analysis platform 230. The feedback information may be binary (e.g., a yes or no response indicating whether a similarity analysis is correct) or N-ary (e.g., a rating scale, a Likert scale, etc.). Additionally, the feedback information may be received in a structured response, as free-form text, and/or the like.

In this way, similarity analysis platform 230 is able to receive feedback information that may be used to improve accuracy of the similarity analysis.

As further shown in FIG. 4, process 400 may include determining whether the feedback information satisfies a threshold (block 450). For example, similarity analysis platform 230 may determine whether the feedback information satisfies a threshold level of accuracy with respect to determining similarity scores for test case groups and/or test case field groups. In this case, the feedback information may include positive feedback (e.g., feedback indicating that the similarity scores are correctly scored) and/or negative feedback (e.g., feedback indicating that the similarity scores are incorrectly scored), and similarity analysis platform 230 may compare the feedback information and a threshold to determine whether the feedback information satisfies the threshold. The threshold might correspond to a threshold amount of positive feedback (e.g., 100%, 95%, etc.), a threshold amount of negative feedback (e.g., 0%, 5%, etc.), and/or the like.

In this way, similarity analysis platform 230 is able to use the threshold to determine whether the similarity analysis techniques and/or the machine learning technique are accurately scoring test case groups and/or test case field-groups.

If the feedback information does not satisfy the threshold (block 450—NO), then process 400 may modify one or more values associated with the machine learning technique (block 460). For example, similarity analysis platform 230 may modify one or more coefficient values, weight values, and/or the like, associated with a data model used to process the feedback information.

In some implementations, similarity analysis platform 230 may use a regression algorithm as part of the data model, and the regression algorithm may assign different weights to different field-level similarity scores. As an example, assume test case one and test case two have the same two fields. Further assume that similarity analysis platform 230 determines test case one and test case two to be similar, and that feedback device 250 provides feedback information indicating that the test cases are not similar. In this case, similarity analysis platform 230 may update the weight values used in the regression algorithm to allow the data model to more accurately perform subsequent similarity analyses.

In some implementations, after modifying one or more values associated with the machine learning technique, similarity analysis platform 230 may determine a new set of overall similarity scores for the set of test case groups (e.g., process 400 may return to block 430). For example, similarity analysis platform 230 may determine a new set of overall similarity scores for the set of test case groups by using the machine learning technique with the one or modified values to analyze the set of field-level similarity scores. In this case, similarity analysis platform 230 may provide the new set of overall similarity scores to feedback device 250 to cause feedback device 250 to provide additional feedback information.

In this way, similarity analysis platform 230 may continue to modify values associated with the machine learning technique until the threshold is satisfied.

If the feedback information satisfies the threshold (block 450—YES), then process 400 may include using the test case information and the set of overall similarity scores to process a request from a user device (block 470). For example, similarity analysis platform 230 may use a data structure to establish one or more associations between the test case information and the set of overall similarity scores, and may use the data structure to process a request from user device 210, such as a request to consolidate the test case information, a request for one or more test cases, and/or the like.

In some implementations, similarity analysis platform 230 may establish one or more associations between the test case information and the set of overall similarity scores using a data structure. For example, similarity analysis platform 230 may update an existing data structure that is used to store test case information by associating the test case information with the set of overall similarity scores. Alternatively, similarity analysis platform 230 may generate a new data structure that may store the association between the test case information and the set of overall similarity scores. In this way, associations between test cases may be stored and subsequently used to process requests from user device 210.

In some implementations, similarity analysis platform 230 may process a request to consolidate the test case information. For example, similarity analysis platform 230 may receive, from user device 210, a request to consolidate the test case information. In this case, similarity analysis platform 230 may compare the set of overall similarity scores (or a new set of similarity scores if a feedback loop has been implemented one or more times) and a similarity threshold to identify one or more test case groups that satisfy the similarity threshold. In this case, similarity analysis platform 230 may remove, from the data structure, test case information associated with the one or more test case groups that satisfy the similarity threshold, and may provide, to user device 210, an indication that the test case information has been consolidated.

In some implementations, similarity analysis platform 230 may process a request for test case information associated with one or more test cases. For example, similarity analysis platform 230 may receive, from user device 210, a request for one or more test cases. The request may be free-form text, a structured request (e.g., upload a document that requests test case information), a voice-activated request, and/or the like, and may request specific test cases or may include parameters identifying characteristics of test cases. In this case, similarity analysis platform 230 may obtain one or more test cases by using the parameters or the requested test cases to search the data structure that stores the test case information. Additionally, similarity analysis platform 230 may provide the one or more test cases to user device 210.

In this way, similarity analysis platform 230 is able to use the test case information and the set of overall similarity scores to process requests from user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, similarity analysis platform 230 conserves memory resources by eliminating redundancies included in the test case repository. Furthermore, similarity analysis platform 230 conserves processing resources that might otherwise be used to search through duplicate records, that might otherwise be used to perform error correction techniques due to queries for test case information returning inaccurate results, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
   one or more processors; and
   one or more instructions that, when executed by the one or more processors, cause the one or more processors to:
   obtain test case information for a set of test cases from a data source, the test case information including at least one of test case description information or test case environment information;
   determine a set of field-level similarity scores by using a set of similarity analysis techniques to analyze a set of test case field groups associated with the test case information,
      the test case information being sorted into a set of test case groups;
   determine a set of overall similarity scores for the set of test case groups by using a machine learning technique to analyze the set of field-level similarity scores,
      each test case group of the set of test case groups being sorted into the set of test case field groups;
   receive feedback information associated with at least a portion of the set of overall similarity scores;
   modify one or more values associated with the machine learning technique based on the feedback information;
   determine a new set of overall similarity scores for the set of test case groups by using the machine learning technique with the one or more modified values to analyze the set of test case field groups;
   update a data structure that stores the test case information into the data source to establish one or more associations between the test case information and the new set of overall similarity scores; and
   process a request from a user device using information included in the updated data structure,
      the request being a request for one or more test cases and including parameters identifying characteristics of the one or more test cases by:
         obtaining the one or more test cases by searching, based on the parameters, the updated data structure that stores the test case information for the one or more test case requested; and
         providing the one or more test cases to the user device.

2. The device of claim 1, where the test case information includes test case defect information.

3. The device of claim 1,
   where each test case group includes test case information for two or more test cases, and
   where the one or more processors, when determining the set of field-level similarity scores, are to:
      analyze the set of test case field groups with the set of similarity analysis techniques, and
      determine the set of field-level similarity scores based on analyzing the set of test case field groups with the set of similarity analysis techniques.

4. The device of claim 1, where the set of similarity analysis techniques includes at least one of:
   a tuple-based similarity analysis technique,
   a data structure-driven similarity analysis technique,
   an approximation-based similarity analysis technique, or
   a reduction-based similarity analysis technique.

5. The device of claim 1, where the one or more processors, when determining the set of overall similarity scores, are to:
   determine an overall similarity score, of the set of overall similarity scores, for a test case group, of the set of test case groups, by using the machine learning technique to analyze field-level similarity scores associated with the test case group,
   where the one or more processors, when using the machine learning technique to analyze the field-level similarity scores, are to:
      determine an overall similarity score for test case field groups that include the test case description information,
      determine an overall similarity score for test case field groups that include the test case environment information, and
      determine the overall similarity score for the test case group based on the overall similarity score for the test case field groups that include the test case description information and the overall similarity score for the test case field groups that include the test case environment information.

6. The device of claim 1, where the one or more processors are further to:
   receive additional feedback information associated with at least a portion of the new set of overall similarity scores;
   further modify the one or more values associated with the machine learning technique based on the additional feedback information; and
   determine another new set of overall similarity scores for the set of test case groups by using the machine learning technique with the one or more further modified values to analyze the set of test case field groups,
      where the one or more processors are to continue to receive additional feedback information, further modify the one or more values associated with the machine learning technique, and determine new sets of overall similarity scores until a threshold is satisfied.

7. The device of claim 1, where the one or more processors, when processing the request, are to:
   receive, after updating the data structure, the request from the user device,
      the request being a request to consolidate the test case information;
   compare the new set of overall similarity scores and a similarity threshold to identify one or more test case groups that satisfy the similarity threshold;
   remove, from the data structure, test case information associated with the one or more test case groups that satisfy the similarity threshold; and
   provide, to the user device, an indication that the test case information has been consolidated.

8. The device of claim 1, where the one or more processors, when receiving the feedback information, are to:
   receive negative feedback information associated with the at least the portion of the set of overall similarity scores; and
   where the one or more processors, when modifying the one or more values associated with the machine learning technique, are to:
      modify the one or more values associated with the machine learning technique based on the negative feedback information.

9. A non-transitory computer-readable medium storing instructions, the instructions comprising:
   one or more instructions that, when executed by one or more processors, cause the one or more processors to:
      obtain test case information for a set of test cases from a data source,
         the test case information for the set of test cases including at least one of:
            test case description information,
            test case environment information, or
            test case defect information;
      determine a set of field-level similarity scores by using a set of similarity analysis techniques to analyze a set of test case field groups associated with the test case information,
         the test case information being sorted into a set of test case groups;
      determine a set of overall similarity scores for the set of test case groups by using a machine learning technique to analyze the set of field-level similarity scores,
         each test case group of the set of test case groups being sorted into the set of test case field groups;
      receive feedback information associated with at least a portion of the set of overall similarity scores;
      modify one or more values associated with the machine learning technique based on the feedback information;
      determine a new set of overall similarity scores for the set of test case groups by using the machine learning technique with the one or more modified values to analyze the set of test case field groups;
      update a data structure that stores the test case information into the data source to establish one or more associations between the test case information and the new set of overall similarity scores; and
      process a request from a user device using information included in the updated data structure,
         the request being a request for one or more test cases and including parameters identifying characteristics of the one or more test cases by:
            obtaining the one or more test cases by searching, based on the parameters, the updated data structure that stores the test case information for the one or more test cases requested, and
            providing the one or more test cases to the user device.

10. The non-transitory computer-readable medium of claim 9, where the one or more instructions, that cause the one or more processors to determine the set of overall similarity scores, cause the one or more processors to:
   provide field-level similarity scores associated with a test case group, of the set of test case groups, as input to a data model to cause the data model to output an overall similarity score of the set of overall similarity scores,
   the field-level similarity scores associated with the test case group including test case field groups that include test case description information, test case field groups that include test case environment information, and test case field groups that include test case defect information.

11. The non-transitory computer-readable medium of claim 9, where the one or more instructions, when executed by the one or more processors, further cause the one or more processors to:
   receive additional feedback information associated with at least a portion of the new set of overall similarity scores;
   further modify the one or more values associated with the machine learning technique based on the additional feedback information; and
   determine another new set of overall similarity scores for the set of test case groups by using the machine learning technique with the one or more further modified values to analyze the set of test case field groups, where the one or more processors are to continue to receive additional feedback information, further modify the one or more values associated with the machine learning technique, and determine new sets of overall similarity scores until a threshold is satisfied.

12. The non-transitory computer-readable medium of claim 9, where the one or more instructions, that cause the one or more processors to process the request, cause the one or more processors to:
receive, after determining the new set of overall similarity scores, the request from the user device,
the request being a request to consolidate the test case information;
compare the new set of overall similarity scores and a similarity threshold to identify one or more test case groups that satisfy the similarity threshold;
remove, from a data structure, test case information associated with the one or more test case groups that satisfy the similarity threshold; and
provide, to the user device, an indication that the test case information has been consolidated.

13. The non-transitory computer-readable medium of claim 9, where the one or more instructions, that cause the one or more processors to receive the feedback information as, cause the one or more processors to:
receive positive feedback information associated with the at least the portion of the set of overall similarity scores; and
where the one or more instructions, that cause the one or more processors to update the data structure that stores the test case information into the data source, cause the one or more processors to:
update the data structure that stores the test case information into the data source based on the positive feedback information.

14. A method, comprising:
obtaining, by a device, test case information for a set of test cases from a data source,
the test case information for the set of test cases including at least one of:
test case description information,
test case environment information, or
test case defect information;
determining, by the device, a set of field-level similarity scores by using a set of similarity analysis techniques to analyze a set of test case field groups associated with the test case information,
the test case information being sorted into a set of test case groups;
determining, by the device, a set of overall similarity scores for a set of test case groups by using a machine learning technique to analyze the set of field-level similarity scores,
each test case group of the set of test case groups being sorted into the set of test case field groups;
receiving, by the device, feedback information associated with at least a portion of the set of overall similarity scores;
modifying, by the device, one or more values associated with the machine learning technique based on the feedback information;
determining, by the device, a new set of overall similarity scores for the set of test case groups by using the machine learning technique with the one or more modified values to analyze the set of test case field groups;
updating, by the device, a data structure that stores the test case information to establish one or more associations between the test case information and the new set of overall similarity scores; and
processing, by the device, a request from a user device using information included in the updated data structure, the request being a request for one or more test cases and including parameters identifying characteristics of the one or more test cases by:
obtaining the one or more test cases by searching, based on the parameters, the updated data structure that stores the test case information for the one or more test cases requested; and
providing the one or more test cases to the user device.

15. The method of claim 14, further comprising:
receiving, after determining the set of overall similarity scores, feedback information associated with at least a portion of the set of overall similarity scores;
modifying one or more values associated with the machine learning technique based on the feedback information;
determining a new set of overall similarity scores for the set of test case groups by using the machine learning technique with the one or more modified values to analyze the set of test case field groups;
updating the data structure that stores the test case information to establish one or more additional associations between the set of test cases and the new set of overall similarity scores; and
where processing the request comprises:
processing the request using the one or more additional associations between the set of test cases and the new set of overall similarity scores.

16. The method of claim 15, where the device is to continue to receive additional feedback information, continue to modify one or more values associated with the machine learning technique, and continue to determine new sets of overall similarity scores until a threshold is satisfied.

17. The method of claim 14,
where each test case group includes test case information for two or more test cases, and
where determining the set of field-level similarity scores comprises:
analyzing the set of test case field groups with the set of similarity analysis techniques, and
determining the set of field-level similarity scores based on analyzing the set of test case field groups with the set of similarity analysis techniques.

18. The method of claim 14, where the set of similarity analysis techniques includes at least one of:
a tuple-based similarity analysis technique,
a data structure-driven similarity analysis technique,
an approximation-based similarity analysis technique, or
a reduction-based similarity analysis technique.

19. The method of claim 14, where determining the set of overall similarity scores comprises:
providing field-level similarity scores associated with a test case group, of the set of test case groups, as input to a data model to cause the data model to output an overall similarity score of the set of overall similarity scores,
the field-level similarity scores associated with the test case group including test case field groups that include test case description information, test case field groups that include test case environment information, and test case field groups that include test case defect information.

20. The method of claim 14, where receiving the feedback information comprises:
  receiving positive feedback information associated with the at least the portion of the set of overall similarity scores; and
  where updating the data structure that stores the test case information into the data source comprises:
    updating the data structure that stores the test case information into the data source based on the positive feedback information.

\* \* \* \* \*

UNITED STATES PATENT AND TRADEMARK OFFICE
CERTIFICATE OF CORRECTION

| | | |
|---|---|---|
| PATENT NO. | : 10,768,893 B2 | |
| APPLICATION NO. | : 15/818456 | |
| DATED | : September 8, 2020 | |
| INVENTOR(S) | : Janardan Misra et al. | |

It is certified that error appears in the above-identified patent and that said Letters Patent is hereby corrected as shown below:

On the Title Page

Item (72), the last sentence after the 4th Inventor listed, "Thane (MH)" should be changed to --Thane (IN)--.

Signed and Sealed this
Twenty-eighth Day of March, 2023

Katherine Kelly Vidal
*Director of the United States Patent and Trademark Office*